Oct. 6, 1953          I. HIRSCHMAN          2,654,290
SPECTACLES WITH PIVOTALLY MOUNTED NOSE REST
Filed June 26, 1951
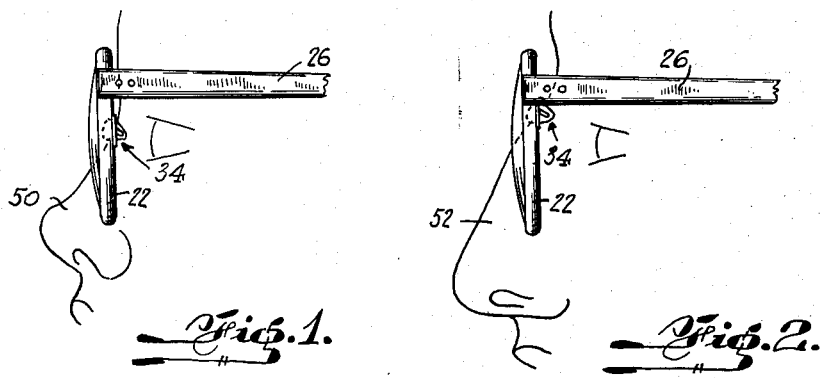
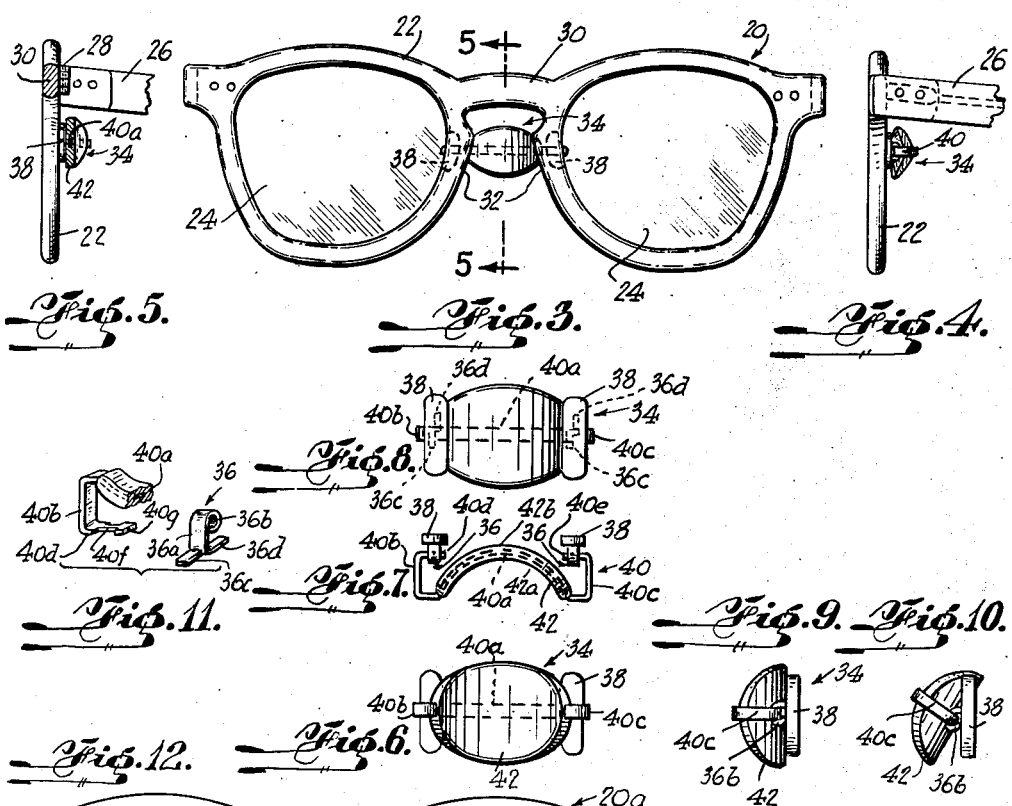
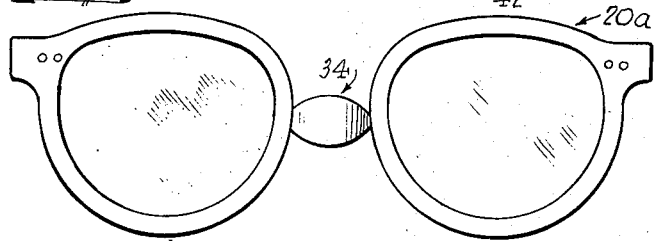
INVENTOR.
IRVING HIRSCHMAN
BY
ATTORNEY Patented Oct. 6, 1953

2,654,290

UNITED STATES PATENT OFFICE 2,654,290

SPECTACLES WITH PIVOTALLY MOUNTED NOSE REST

Irving Hirschman, Brooklyn, N. Y.

Application June 26, 1951, Serial No. 233,660

1 Claim. (Cl. 88—55)

This invention relates to a swivelly mounted nose rest for eyeglass frames.

Conventional eyeglass or spectacle frames are provided with bridges which are fixed in position relative to the lenses. There was a time when these eyeglass frame bridges were made to rest upon the bridge of the nose, but of late nose pads have been provided for contact with the sides of the nose and the spectacle frame bridges have been elevated a spaced distance above nose bridge. Spectacle frames are still made, of course, with bridges which rest upon the bridge of the nose, but in the main, particularly in this country, spectacle frame bridges are employed solely as a structural link between the two sides of the spectacle frames, and not as a nose rest.

When the spectacle frame bridges were conventionally used as nose rests, it was found difficult accurately to adjust the spectacle frames to the optical requirements of the individual spectacle frame wearers for the reason that there was a fixed relationship between the spectacle frame bridges on the one hand and the focal centers of the lenses on the other hand, whereas the relationship between the bridge of the nose and the line of sight of the wearer of the glasses would vary in every individual case. When manufacturers of spectacle frames switched to the modern type of frame wherein nose pads serve as nose rests, the same problem of accurately positioning the frames with respect to the individual requirements of the wearers of these frames was encountered since there is a fixed space relationship between the nose pads and the focal centers of the lenses. This problem has not heretofore been satisfactorily solved.

The fixed bridges of the spectacle frames of the past and the fixed nose pads of the spectacle frames of the present have been found to be uncomfortable in many cases. They are rigid and unyielding and in many instances they fail to conform to the contours of the nose. Consequently, many spectacle wearers are unable to bear the pressure which these bridges or nose pads exert upon the nose.

It is the principal object of this invention to provide a nose rest which is adjustably and swivelly mounted on spectacle frames so as to conform each pair of eyeglasses and the frames which support them to the individual requirements of the individual wearer. The requirements to which reference is here made, are twofold: the optical requirements of the wearer's eyes and the comfort requirements in properly supporting the spectacles in optically correct positions. The nose rest which is herein claimed is adjustable in the sense that it may be fixed in varying positions on the spectacle frames, but once so fixed, it is no longer adjustable. The nose rest herein claimed is swivelly mounted in the sense that it is swivelly movable about a longitudinal axis which extends horizontally across the spectacle frame from side to side thereof. Since its position on the frame may be adjusted before it is affixed thereto, it may be mounted in precisely the right place for maintaining the focal centers of the two lenses in line with the eyes. Since it is swivelly mounted on the frame, it automatically adjusts itself to the contours of the nose on which it rests. The first of these two features makes for optical correctness of the fit of the glasses to the individual optical requirements of the individual wearer. The second of these two features makes for great comfort in wearing the glasses, especially in those cases where the pressure of conventional nose pads cannot be tolerated.

There is another distinct advantage in providing a nose rest which automatically swivels into conformity with the contours of the nose. This advantage is the fact that a nose rest which conforms to the contours of the nose displays less tendency to slip down the nose than nose rests which are unable by reason of their rigidity to conform to the nose contours. This is particularly true of conditions in hot humid weather where perspiration functions in the manner of a lubricant to destroy the friction which is normally required to prevent slippage.

The self-adjusting bridge or nose rest described herein is essentially advantageous to spectacle wearers who are afflicted with sinus trouble because no pressure is applied to the sides of the nose, the spectacle frame being supported by the bridge of the nose.

A preferred form of this invention is illustrated in the accompanying drawing, in which:

Fig. 1 is a fragmentary side view of a pair of eyeglasses in which the nose rest herein claimed is incorporated, showing how said nose rest is positioned with respect to a nose having a relatively low bridge.

Fig. 2 is a similar view showing the nose rest occupying a different position with respect to a nose having a high or prominent bridge.

Fig. 3 is a front view of a pair of eyeglasses showing the nose rest herein claimed mounted thereon.

Fig. 4 is a fragmentary side view, somewhat similar to that of Fig. 1, but on an enlarged scale.

Fig. 5 is a vertical section on the line 5—5 of Fig. 3.

Fig. 6 is an inside view or back view of the nose rest herein claimed.

Fig. 7 is a top view thereof.

Fig. 8 is an outside or front view of said nose rest.

Fig. 9 is a side view of the nose rest.

Fig. 10 is a similar view showing the nose rest in tilted position to show its swivelling action.

Fig. 11 is an exploded view showing two of the parts which comprise the nose rest, one of said parts being used in duplicate.

Fig. 12 is a front view of a pair of eyeglasses similar to that shown in Fig. 3, showing a modification without the fixed bridge.

The eyeglass or spectacle frame 20 shown in the drawing is intended to illustrate a conventional frame made of plastics. It comprises a lens-holding frame proper 22, a pair of lenses 24 mounted therein, and a pair of temples 26 which are hingedly connected to frame 22 by means of hinges 28. It will be noted that frame 22 includes a fixed integral bridge 30 and fixed integral nose pads 32. When the spectacles as thus far described are worn in conventional manner, nose pads 32 engage the sides of the nose and bridge 30 is elevated a spaced distance above the bridge of the nose.

The nose rest 34 herein claimed comprises six elements: a pair of bearings 36, a pair of plastic pads 38 on said bearings, a bridge 40 which is swivelly connected to said bearings, and a nose pad 42 on said bridge, said nose pad, like pads 38, being made of plastics. Bearings 36 and bridge 40 are made of metal, preferably, although not necessarily, stamped and bent metal.

Fig. 11 shows the constructional details of one of the bearings 36. It comprises a strip of metal 36a which is curled at the top to form a loop or bearing 36b and which is bifurcated at the bottom to provide a pair of feet 36c and 36d, respectively, which are bent in opposite directions and which occupy a substantially common plane. Pad 38 is molded upon feet 36c and 36d to provide the result shown in Figs. 7 and 8.

Bridge 40 is best shown in Figs. 7 and 11. It includes an arcuate yoke 40a, a pair of legs 40b and 40c, respectively, which are in spaced parallel relation to each other, and a pair of feet 40d and 40e, respectively, which are coaxially aligned substantially at right angles to legs 40b and 40c. Molded on yoke 40a is the plastic nose pad 42. The nose pad is somewhat oval in outline shape and it is curved to correspond to the curvature of yoke 40a and to present a concave inner face or surface 42a and a convex outer face or surface 42b. It is the inner concave surface 42a which fits upon the bridge of the nose to support the spectacle frame thereon.

It will be noted in Fig. 7 that coaxial feet 40d and 40e of the bridge project into loops 36b of the bearings. They are free to engage in pivotal movement about their common axis in said bearing loops, and it is in this way that the bridge, which constitutes the nose rest proper, is enabled to engage in swivelling movement.

It will be noted in Fig. 11 that feet 40d and 40e, or one of them, may be provided with a narrow neck portion 40f and a relatively wide end portion 40g. The narrow neck portion fits into the loop of the bearing and the wide end portion serves as a shoulder or stop member to prevent accidental dislodgment of the foot from the bearing loop.

The two bearings may be secured to the spectacle frame in the neighborhood of the former location of nose pads 32 (which had been removed or eliminated), by means of a plastic cement or by any other means that two plastic objects may be fastened together. A suitable solvent, for example, may be applied both to the spectacle frame and to the bearing pads, and they may then be pressed together properly to locate the bearings relative to the frame and to fasten them together. The locations of the bearings on the spectacle frame will vary in accordance with the individual requirements of the wearers. Thus they occupy a lower position in Fig. 1 to accommodate the nose rest to a nose 50 which has a relatively low bridge, and a higher position in Fig. 2 to accommodate the nose rest to a nose 52 which has a relatively prominent bridge. It is for the optometrist to set the bearings in proper position and once this is done, they remain fixed in such position for the life of the spectacle frame.

It will be understood that the foregoing is descriptive of a preferred form of this invention, and modifications of this form as well as other forms may be provided within the broad spirit of the invention and the broad scope of the claim. For instance, the conventional fixed integral bridge 30 may be removed or dispensed with since the present self-adjusting nose rest or bridge will supplant it.

Having thus described my invention, what I claim as new and desire to secure by Letters Patent, is:

A nose rest for a plastic spectacle frame, said nose rest comprising a bridge, and a pair of bearings for attachment to the spectacle frame, said bearings pivotally supporting said bridge, each said bearing engaging an oppositely disposed end portion of the bridge, and each said bearing comprising a body portion, a loop at the top of the body portion which receives one end of the bridge, leaving the same free to engage in swivelling movement in said loop, a pair of oppositely disposed feet at the bottom of the body portion, said feet lying on a common plane, and a plastic pad secured on said feet for attachment to the frame.

IRVING HIRSCHMAN.

References Cited in the file of this patent

UNITED STATES PATENTS

| Number | Name | Date |
|---|---|---|
| 461,364 | McBride et al. | Oct. 13, 1891 |
| 1,978,276 | Nelson | Oct. 23, 1934 |
| 2,066,735 | Montgomery | Jan. 5, 1937 |
| 2,109,949 | Oliver | Mar. 1, 1938 |
| 2,110,459 | Bodee | Mar. 8, 1938 |
| 2,321,083 | Higgins | June 8, 1943 |
| 2,326,846 | Fair | Aug. 17, 1943 |
| 2,547,467 | Hurst | Apr. 3, 1951 |

FOREIGN PATENTS

| Number | Country | Date |
|---|---|---|
| 72,234 | Germany | Feb. 28, 1893 |
| 291,395 | Germany | May 14, 1914 |
| 701,971 | Germany | Jan. 28, 1941 |